(12) United States Patent
DeSisto et al.

(10) Patent No.: US 8,981,168 B2
(45) Date of Patent: Mar. 17, 2015

(54) FORMATE-ASSISTED PYROLYSIS

(71) Applicant: University of Maine System Board of Trustees, Bangor, ME (US)

(72) Inventors: William Joseph DeSisto, Orono, ME (US); Marshall Clayton Wheeler, Orono, ME (US); Adriaan R. P. van Heiningen, Orono, ME (US)

(73) Assignee: University of Maine System Board of Trustees, Bangor, MD (US)

( * ) Notice: Subject to any disclaimer, the term of this patent is extended or adjusted under 35 U.S.C. 154(b) by 37 days.

(21) Appl. No.: 13/734,077

(22) Filed: Jan. 4, 2013

(65) Prior Publication Data

US 2014/0100396 A1    Apr. 10, 2014

Related U.S. Application Data

(60) Provisional application No. 61/582,958, filed on Jan. 4, 2012, provisional application No. 61/600,232, filed on Feb. 17, 2012, provisional application No. 61/652,018, filed on May 25, 2012.

(51) Int. Cl.
| | |
|---|---|
| *C10G 1/00* | (2006.01) |
| *C10K 1/02* | (2006.01) |
| *C10B 49/22* | (2006.01) |
| *C10B 53/02* | (2006.01) |
| *C10B 57/06* | (2006.01) |
| *C10C 5/00* | (2006.01) |

(52) U.S. Cl.
CPC ............... *C10G 1/002* (2013.01); *C10K 1/024* (2013.01); *C10B 49/22* (2013.01); *C10B 53/02* (2013.01); *C10B 57/06* (2013.01); *C10C 5/00* (2013.01); *C10G 2300/1014* (2013.01); *Y02E 50/14* (2013.01)
USPC .......................................... 585/242; 585/240

(58) Field of Classification Search
USPC .................................................. 585/240, 242
See application file for complete search history.

(56) References Cited

U.S. PATENT DOCUMENTS

| | | | |
|---|---|---|---|
| 4,087,373 | A | 5/1978 | Reed, Jr. |
| 6,387,221 | B1 | 5/2002 | Schoenhard |
| 2011/0098503 | A1 | 4/2011 | Wheeler et al. |

(Continued)

FOREIGN PATENT DOCUMENTS

| | | |
|---|---|---|
| WO | WO-2011/123897 | 10/2011 |
| WO | WO 2011123897 A1 * | 10/2011 |

OTHER PUBLICATIONS

Demirbas, A., Mechanisms of liquefaction and pyrolysis reactions of biomass, Energy Conversion & Management, 41:633-646 (2000).

(Continued)

*Primary Examiner* — Bobby Ramdhanie
*Assistant Examiner* — Youngsul Jeong
(74) *Attorney, Agent, or Firm* — Choate, Hall & Stewart LLP; Brian E. Reese

(57) ABSTRACT

The present invention provides, among other thing, methods for creating significantly deoxygenated bio-oils form biomass including the steps of providing a feedstock, associating the feedstock with an alkali formate to form a treated feedstock, dewatering the treated feedstock, heating the dewatered treated feedstock to form a vapor product, and condensing the vapor product to form a pyrolysis oil, wherein the pyrolysis oil contains less than 30% oxygen by weight.

14 Claims, 8 Drawing Sheets

(56) References Cited

U.S. PATENT DOCUMENTS

2011/0232158 A1    9/2011    Carter
2012/0203043 A1    8/2012    Wheeler et al.

OTHER PUBLICATIONS

Jin, et al., Hydrothermal conversion of carbohydrate biomass into formic acid at mild temperatures, Green Chemistry, 10(6):612-615 (2008).

Kuitunen, et al., Lignin oxidation mechanisms under oxygen delignification conditions. Part 3. Reaction pathways and modeling, Holzforschung, 65:587-599 (2011).

International Search Report and Written Opinion for PCT/US2013/020224, mailed Apr. 29, 2013.

Agblevor, F. A., et al., Fractional Catalytic Pyrolysis of Hybrid Poplar Wood, Ind. Eng. Chem. Res., (2010), 49:3533-3538.

Beis, S. H., et al., Fast Pyrolysis of Lignins. BioResources, (2010), 5:1408-1424.

Case, P. A., et al., Liquid Hydrocarbon Fuels from Cellulosic Feedstocks Via Thermal Deoxygenation of Levulinic Acid and Formic Acid Salt Mixtures, Green Chem., (2012), 14:85-89.

Consonni, S., et al, A Gasification-based Biorefinery for the Pulp and Paper Industry, Chemical Engineering Research and Design, (2009), 87:1293-1317.

de Wild, P., et al., In Lignin Valorisation for Chemicals and (Transportation) Fuels via (Catalytic) Pyrolysis and Hydrodeoxygenation, (2009), 461-469.

Dorrestijn, E., et al., The Occurrence and Reactivity of Phenoxyl Linkages in Lignin and Low Rank Coal, J. Anal. Pyrolysis (2000), 54:153-192.

Hicks, J. C., Advances in C-O Bond Transformations in Lignin-Derived Compounds for Biofuels Production, J. Phys. Chem. Lett., (2011), 2:2280-2287.

Jackson, M.A. et al., Screening Heterogeneous Catalysts for the Pyrolysis of Lignin, J. Anal. Appl. Pyrolysis 2009; 85:226-230.

Joseph, J. B., et al., Chemical Shifts and Lifetimes for Nuclear Magnetic Resonance (NMR) Analysis of Bio-fuels, Energy Fuels (2010), 24:5153-5162.

Kleinert, M. and Barth, T., Towards a Lignincellulosic Biorefinery: Direct One-Step Conversion of Lignin to Hydrogen-Enriched Biofuel, Energy Fuels, (2008), 22:1371-1379.

Marshall, A. L. and Alaimo, P. J., Useful Products from Complex Starting Materials: Common Chemicals from Biomass Feedstocks, Chemistry European Journal, (2010), 16:4970-4980.

Niemelä, K. and Alen, R., Analytical Methods in Wood Chemistry, Pulping and Papermaking, Springer Series in Wood Science, 1999, p. 196.

Nowakowski, D. J., et al., Lignin fast pyrolysis: Results from an international collaboration, Journal of Analytical and Applied Pyrolysis, (2010), 88:53-72.

Perlack, R. D., et al., Biomass as a Feedstock for a Bioenergy and Bioproducts Industry: The Technical Feasibility of a Billion-Ton Annual Supply, US Department of Energy, (2005), 78 pages.

Windt, M., et al., Micro-pyrolysis of Technical Lignins in a New Modular Rig and Product Analysis by GC-MS/FID and GC x GC-TOFMS/FID, J. Anal. Appl. Pyrolysis (2009), 85:38-46.

Zakzeski, J.; et al., The Catalytic Valorization of Lignin for the Production of Renewable Chemicals, Chem. Rev. (2010), 110:3552-3599.

Zhang, J., et al., Spherical Microporous/Mesoporous Activated Carbon from Pulping Black Liquor, J. Chem Technol and Biotechnol, (2011), 86:1177-1183.

\* cited by examiner

US 8,981,168 B2

FORMATE-ASSISTED PYROLYSIS

CROSS-REFERENCE TO RELATED APPLICATIONS

This application claims priority from U.S. provisional patent application Ser. No. 61/582,958, filed Jan. 4, 2012, U.S. provisional patent application Ser. No. 61/600,232, filed Feb. 17, 2012, and U.S. provisional patent application Ser. No. 61/652,018, filed May 25, 2012, the disclosures of which are hereby incorporated by reference in their entirety.

GOVERNMENT SUPPORT

This invention was made with government support under DE-FG02-07ER46373 awarded by the Department of Energy, Experimental Program to Stimulate Competitive Research in the Office of Basic Energy Sciences. The Federal Government has certain rights in the invention.

BACKGROUND

Broad commercialization of renewable transportation fuels and chemicals produced from biomass has been hindered by several significant challenges. The first challenge is managing the high commercial cost of transporting biomass for processing. Second, bio-oils produced from known methods typically produce very poor quality oil, which must be significantly upgraded via expensive and complex processes, including through the use of precious metal catalysts and very high pressures. Third, known processes used to break down biomass can result in the formation of large amounts of char, which itself is a waste product and can cause technical challenges such as reactor plugging. Fourth, the spent pulping or fractionation liquors produced by dissolving mostly lignin and hemicellulose from lignocellulosic biomass to release cellulosic fibers, have been considered too complex in nature for whole conversion to liquid duels and chemicals, and therefore there are presently mostly burned for recovery of energy and pulping chemicals. Due to these and other challenges and disadvantages, widespread use of biomass to produce renewable fuel and other chemicals has not reached broad acceptance.

SUMMARY OF THE INVENTION

The present invention provides, among other things, significantly improved methods for thermally converting biomass, including woody biomass, and spent pulping/fractionation liquors, into highly deoxygenated fuels and chemicals. The methods of the present invention are surprising because it was discovered that associating a feedstock with an alkali formate, formate salt or formic acid prior to a pyrolysis reaction can lead to formation of significantly deoxygenated products without the need for addition of either exogenous hydrogen or precious metal catalysts during the pyrolysis reaction. Another surprising aspect of the present invention is that addition of an alkali formate, formate salt or formic acid as herein described allows for biomass to be converted to deoxygenated products at lower pressures than previously tenable, including atmospheric pressure or even below atmospheric pressure.

In one aspect, the present invention provides methods including the steps of providing a feedstock, associating the feedstock with an alkali formate to form a treated feedstock, dewatering the treated feedstock, heating the dewatered treated feedstock to form a vapor product, and condensing the vapor product to form a pyrolysis oil, wherein the pyrolysis oil contains less than 30% oxygen by weight.

In some embodiments, the feedstock is selected from the group consisting of cellulosic biomass, wood, wood waste, lignin, spent pulping/fractionation liquors, algal biomass, food waste, sludges and municipal solid waste, and mixtures thereof.

In some embodiments, the alkali formate is selected from the group consisting of calcium formate, magnesium formate, sodium formate, potassium formate, lithium formate, zinc formate, and mixtures thereof.

A variety of temperature conditions may be used to heat the dewatered treated feedstock, according to various embodiments. In some embodiments, the dewatered treated feedstock is heated to between about 200° C. and about 800° C. In some embodiments, the dewatered treated feedstock is heated to between about 375° C. and about 500° C. In some embodiments, the dewatered treated feedstock is heated for between about one second and about four hours.

Another advantage provided according to various embodiments, is an ability to generate fuels and chemicals from biomass at lower pressures than previously known. In some embodiments, at least one of the associating, dewatering, heating and condensing steps is carried out at a pressure between about vacuum and about 10 bar.

In another aspect, the present invention provides methods including the steps of providing a feedstock, associating the feedstock with an oxidant to form an oxidized feedstock, associating the oxidized feedstock with an alkali formate to form an oxidized treated feedstock, dewatering the oxidized treated feedstock, heating the dewatered treated feedstock to form a vapor product, and condensing the vapor product to form a pyrolysis oil, wherein the pyrolysis oil contains less than 30% oxygen by weight.

In some embodiments, the feedstock is selected from the group consisting of cellulosic biomass, wood, wood waste, lignin, spent pulping/fractionation liquors, algal biomass, food waste, sludges and municipal solid waste, and mixtures thereof.

In some embodiments, the oxidant is selected from the group consisting of hydrogen peroxide, ozone, oxygen, and combinations thereof.

In some embodiments, the alkali formate is selected from the group consisting of calcium formate, magnesium formate, sodium formate, potassium formate, lithium formate, zinc formate, and mixtures thereof.

A variety of heating temperatures are provided for according to various embodiments. In some embodiments, the dewatered treated feedstock is heated to between about 200° C. and about 800° C. In some embodiments, the dewatered treated feedstock is heated to between about 375° C. and about 500° C. In some embodiments, the dewatered treated feedstock is heated for between about one second and about four hours.

Another advantage provided according to various embodiments, is an ability to generate fuels and chemicals from biomass at lower pressures than previously known. In some embodiments, at least one of the associating, dewatering, heating and condensing steps is carried out at a pressure between about vacuum and about 10 bar.

In yet another aspect, the present invention provides methods including the steps of providing a feedstock, associating the feedstock with an alkali formate in the presence of an oxidant to form an oxidized treated feedstock, dewatering the oxidized treated feedstock, heating the dewatered treated feedstock to form a vapor product, and condensing the vapor product to form a pyrolysis oil, wherein the pyrolysis oil contains less than 30% oxygen by weight.

In some embodiments, the feedstock is selected from the group consisting of cellulosic biomass, wood, wood waste, lignin, spent pulping/fractionation liquors, algal biomass, food waste, sludges and municipal solid waste, and mixtures thereof.

In some embodiments, the alkali formate is selected from the group consisting of calcium formate, magnesium formate, sodium formate, potassium formate, lithium formate, zinc formate, and mixtures thereof.

In some embodiments, the oxidant is selected from the group consisting of hydrogen peroxide, ozone, oxygen, and combinations thereof.

A variety of temperature conditions may be used to heat the dewatered treated feedstock, according to various embodiments. In some embodiments, the dewatered treated feedstock is heated to between about 200° C. and about 800° C. In some embodiments, the dewatered treated feedstock is heated to between about 375° C. and about 500° C. In some embodiments, the dewatered treated feedstock is heated for between about one second and about four hours.

Another advantage provided according to various embodiments, is an ability to generate fuels and chemicals from biomass at lower pressures than previously known. In some embodiments, at least one of the associating, dewatering, heating and condensing steps is carried out at a pressure between about vacuum and about 10 bar.

As used in this application, the terms "about" and "approximately" are used as equivalents. Any numerals used in this application with or without about/approximately are meant to cover any normal fluctuations appreciated by one of ordinary skill in the relevant art.

Other features, objects, and advantages of the present invention are apparent in the detailed description that follows. It should be understood, however, that the detailed description, while indicating embodiments of the present invention, is given by way of illustration only, not limitation. Various changes and modifications within the scope of the invention will become apparent to those skilled in the art from the detailed description.

DETAILED DESCRIPTION OF CERTAIN EMBODIMENTS

Figure 1:
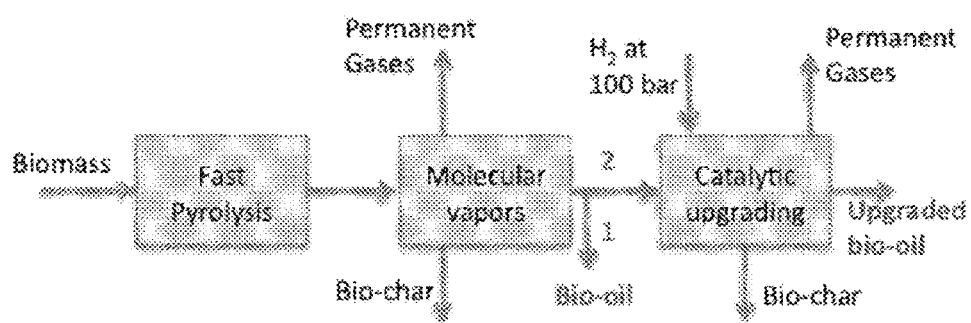
FIG. 1 shows a conceptual flow diagram of previous efforts to create deoxygenated bio-oils from biomass.

The present invention provides new methods for improving the form and content of pyrolysis oils produced through pyrolysis and/or thermal deoxygenation. Previously, deoxygenating a biomass-derived feedstock via pyrolysis involved using expensive precious metal catalysts and/or complex processes. The present invention provides, among other things, a relatively simple method for producing significantly deoxygenated bio-oils from biomass without the need for such catalysts and/or processes.

Pyrolysis

Pyrolysis of biomass is a process whereby biomass is heated to an intermediate temperature, typically 500° C., (residence times on the order of one second to four hours) and then quenched to collect the product. During pyrolysis, the biomass is deconstructed or fragmented into smaller molecular units that condense into a product called pyrolysis oil, or bio-oil. During pyrolysis, char and permanent gases are also formed as products, although the process can be tuned to maximize liquid yield, typically between 60-70 wt % of the biomass feed. The relative popularity of this process as a thermochemical platform to transform biomass into fuels and chemicals stems from its relative simplicity and flexibility; it is able to process a diverse number of biomass feedstocks.

One biomass feedstock that has been processed using pyrolysis is wood. With the pyrolysis of wood, one observes that the main constituents (cellulose, hemicellulose and lignin) follow different decomposition pathways during pyrolysis. For example, thermogravimetric analysis shows that: 1) hemicellulose decomposition starts at 220° C. and is completed at 400° C., 2) cellulose decomposes between 320 and 420° C., and 3) lignin decomposition extends over a very wide range of about 160 to 850° C. and proceeds at a much slower rate than the carbohydrates. The condensable gases which together with (reaction) water form bio-oil are mainly derived from the cellulose fraction (about 45% in wood), while hemicellulose (about 25% in wood) and lignin (about 25% in wood) yield substantial quantities of char and gas. A possible explanation for the latter is that hemicellulose and lignin are linked by covalent bonds (Lignin-Carbohydrate Complexes or LCCs) which prevent their ready release during pyrolysis. Indirect evidence that lignin is the major contributor to char is that the elementary composition of pyrolysis-derived char is close to that of lignin. Accordingly, pyrolysis of woody biomass results in a complex product, including highly oxygenated compounds and significant amounts of char.

As evidenced by the discussion of the pyrolysis of wood, despite its simplicity and flexibility, pyrolysis has its challenges. In particular, the bio-oil produced is of poor quality and limited use as a fuel or source of commodity chemicals. Bio-oil, like biomass, contains significant quantities of oxygen in the form of oxygenates. These oxygenates include carboxylic acids, aldehydes, ketones, and phenolics. Bio-oil produced via traditional pyrolysis reactions is water-soluble with a low pH that is unstable at ambient conditions due to condensation reactions that increase the molecular weight distribution and increase viscosity. Also, pyrolysis of woody biomass can produce significant amounts of char, which is a major cause of reactor plugging. Therefore, for these and other reasons, vast resources have been expended to develop technologies that remove oxygen and improve the properties of the oil either during or after pyrolysis.

Existing Oxygen Removal Strategies

Traditionally, two major oxygen-removal strategies have been used to try to improve the quality of pyrolysis oils. The first involves incorporating catalysts into the pyrolysis process. Typical catalysts include zeolite cracking catalysts that remove oxygen as carbon dioxide, decreasing carbon yield in the product but not requiring external hydrogen. The second strategy involves hydrotreating the bio-oil using precious metal catalysts, typically ruthenium or platinum (although in some cases sulfide CoMo/alumina is used). In this case, reactions take place at 200 bar and 200-350° C. Note that both processes rely on catalysts and issues with coking, catalyst attrition and lifetime remain major issues in going forward with these technologies. Further, the added complexity and expense make it unlikely that pyrolysis will continue to be attractive as a scalable technology.

FIG. 1 shows a flow diagram of these traditionally used processes for removing oxygen from bio-oil. Specifically, FIG. 1 shows a biomass being broken down via a pyrolysis reaction into molecular vapors, permanent non-condensable gases, and char. The molecular vapors are then condensed to form a bio-oil (1) that is highly oxygenated, water soluble, acidic and unstable. Due to these properties, the bio-oil is stabilized and deoxygenated (2) using catalysts such as zeolite cracking catalysts or hydrodeoxygenation catalysts (hydrogen added at elevated pressures) or combinations thereof. The resulting oil can range in oxygen content down to oxygen-free, depending upon the severity of the upgrading steps. However, this process of deoxygenating also causes a reduction in carbon yield, since many bio-oil components directly form coke or carbon on the catalysts.

Formate-Assisted Pyrolysis

In one aspect, the present invention removes the need for catalysts and high pressures by providing an alkali formate, alkali formate salt, and/or formic acid that is associated with the feedstock prior to treatment through pyrolysis. The addition of alkali formate(s), alkali formate salt(s), and/or formic acid to biomass feedstocks prior to pyrolysis (i.e. formate assisted pyrolysis, or FAsP) has yielded increased carbon yields and decreased oxygen content in the product pyrolysis oil. Without wishing to be held to a particular theory, in some embodiments, the co-decomposition of alkali formate salts with biomass during pyrolysis is thought to generate (reactive) hydrogen in-situ, comparable to hydrogen at elevated pressures in the presence of a precious metal catalyst. For example, an oil produced from FAsP of lignin consisted of alkylated phenols with an O:C ratio of 0.067 and a higher heating value of 41.7 MJ/kg, approaching crude petroleum. In addition, carbon yields increased from 21.3 to 28.6% in the liquid product when compared to conventional pyrolysis of lignin. There were additional benefits in materials handling for FAsP of lignin, including reduced char formation. These results were particularly surprising because lignin is known to be difficult to process and decompose. Similar liquid product improvements have been realized by applying FAsP to wood feedstock. For example, applying FAsP to pine sawdust an oil product with an O:C ratio as low as 0.07 has been produced.

During pyrolysis of mixtures of lignin and alkali formate salts, many chemical and physical processes are thought to occur simultaneously. Without wishing to be held to a particular theory, it is believed the following phenomena may occur. First, the lignin melts then decomposes allowing lower molecular weight fragments to vaporize. Cross-linking reactions in the residual lignin allow release of methoxyl and small alkyl radicals to initiate the formation of solid char and alkali carbonate salts. At about 450° C. the alkali formate salts decompose to form more alkali carbonate and (reactive) hydrogen and carbon monoxide. It may be important that hydrogen (possibly radicals) are generated within, or in the vicinity of, the solid particles. This may be more effective than trying to deliver molecular hydrogen from the gas phase to the decomposing particles. The hydrogen at this high temperature may react with the decomposing lignin thereby decreasing char formation and increasing evaporation of volatile lignin fragments. In the gas phase these phenolic fragments are also hydrogenated by the formate-based hydrogen, thereby minimizing excessive polymerization to tar-like products and char.

In one aspect, the present invention provides methods including the steps of providing a feedstock, associating the feedstock with an alkali formate to form a treated feedstock, dewatering the treated feedstock, heating the dewatered treated feedstock to form a vapor product, and condensing the vapor product to form a pyrolysis oil, wherein the pyrolysis oil contains less than 30% oxygen by weight.

The term "feedstock" as used herein refers to a solid or liquid feedstock comprising material from living or formerly living organisms, for example, plant or animal matter. In some embodiments, a feedstock may be one or more of cellulosic biomass, wood, wood waste, lignin, spent pulping/fractionation liquors, algal biomass, fungal biomass, animal biomass, food waste, sludges and municipal solid waste, and mixtures thereof. In some embodiments, certain portions of a biomass may be used as a feedstock such as, for example, cellulose, cellobiose, xylan, lignin (including organosolv lignin, Kraft lignin, soda-AQ lignin, and lignosulfonate).

Any of a variety of alkali formates may be used according to various embodiments. It is contemplated that any alkali formate or formate salt that decomposes in between 200° C.-800° C. to form hydrogen and carbon monoxide is within the scope of the present invention. Exemplary alkali formates include calcium formate, magnesium formate, sodium formate, potassium formate, lithium formate, zinc formate, and mixtures thereof.

Dewatering of a feedstock or treated feedstock may be performed according to known methods. An exemplary method for dewatering a feedstock or treated feedstock is via extended exposure to temperatures at, below, or above the boiling temperature of water, 100° C., though any other known method of removing water from a system may also be used according to certain embodiments. Additional examples of dewatering techniques include ambient air drying, electroacoustic dewatering, electro-osmosis, rotary vacuum filtration, centrifugation, filter pressing, and continuous belt filter pressing.

Heating, or pyrolysis, is carried out under high temperature conditions. The specific heating temperature/high temperature condition may vary according to the specific feedstock or feedstocks used in a particular reaction. Additional factors that might affect the specific heating temperature used include the presence or absence of contaminants or waste products, the length of time available for the reaction, and the level of pressure present in the system during the pyrolysis reaction. In some embodiments, the heating temperature may be between 200° C. and 800° C. In some embodiments, the heating temperature may be between 200° C. and 700° C., between 200° C. and 600° C., between 200° C. and 500° C., between 250° C. and 500° C., between 300° C. and 500° C., between 325° C. and 500° C., between 350° C. and 500° C., between 375° C. and 500° C., between 400° C. and 500° C., between 200° C. to 450° C., between 250° C. to 450° C., between 300° C. to 450° C., or between 300° C. to 400° C.

In some embodiments, a carrier gas may be used during heating/pyrolysis. Certain embodiments may benefit from a carrier gas being present during heating in order to further reduce char formation and trapping of deoxygenated reaction products. While any carrier gas known in the art may be used, in some embodiments, a carrier gas may be selected from nitrogen, water vapor (e.g. steam), carbon monoxide, hydrogen, methane and mixtures thereof including recycling of the non-condensible fraction of pyrolysis vapors.

According to various embodiments, a feedstock, treated feedstock or dewatered treated feedstock may be heated for any application-appropriate period of time. This length of time is sometimes referred to as the residence time. In some embodiments, the treated feedstock or dewatered treated feedstock is heated for an extended period of time. In some embodiments, the extended period of time may be between one second and about four hours, between one second and three hours, between one second and two hours, between one second and one hour, between one minute and one hour, between one minute and forty five minutes, between one minute and thirty minutes, between one minute and ten minutes, between one minute and five minutes.

In some embodiments, a feedstock, treated feedstock or dewatered treated feedstock may be heated for a shorter period of time including, for example, one tenth of a second, two tenths of a second, three tenths of a second, four tenths of a second, five tenths of a second, six tenths of a second, seven tenths of a second, eight tenths of a second, or nine tenths of a second. In some embodiments heating may be for: between one tenth of a second and one minute, between one tenth of a second and forty five seconds, between one tenth of a second and thirty seconds, between one tenth of a second and twenty seconds, between one tenth of a second and ten seconds, between five tenths of a second and one minute, between five tenths of a second and forty five seconds, between five tenths of a second and thirty seconds, between five tenths of a second and twenty seconds, or between five tenths of a second and ten seconds.

Condensing of a vapor product may be performed through any known method. Exemplary methods of condensing a vapor product include cooling the vapor product through either active or passive means, increasing the pressure that a vapor product is exposed to, absorption, adsorption, and/or electrostatic precipitation. Specialized equipment may be used to condense a vapor product including, but not limited to, a surface condenser, such as a Liebig condenser, a Graham condenser, or an Allihn condenser, direct contact condensers, or any other known condenser.

Pyrolysis oil, or "bio-oil," as used herein, describes the product of a pyrolysis or thermal deoxygenation reaction, including both formate-assisted or traditional reactions. For the purposes of this disclosure, the terms pyrolysis oil and bio-oil are used interchangeably.

Pyrolysis oil produced according to various embodiments has a significantly lower oxygen content than pyrolysis oil produced via traditional pyrolysis methods. In some embodiments, the pyrolysis oil contain less than 35% oxygen by weight, less than 30% oxygen by weight, less than 25% oxygen by weight, less than 20% oxygen by weight, less than 15% oxygen by weight, less than 10% oxygen by weight, less than 9% oxygen by weight, less than 8% oxygen by weight, less than 7% oxygen by weight, less than 6% oxygen by weight, less than 5% oxygen by weight, less than 4% oxygen by weight, less than 3% oxygen by weight, less than 2% oxygen by weight, less than 1% oxygen by weight. In some embodiments, the pyrolysis oil contains approximately 0% oxygen by weight. The measurement of oxygen content can be via any of a variety of known methods, including elemental analysis, nuclear magnetic resonance, neutron activation, and gas chromatography-mass spectroscopy.

Another surprising aspect of the invention is that treating a feedstock with one or more oxidizing agents can actually improve the deoxygenation of the resultant pyrolysis oil and greatly improve the feedstock processing during pyrolysis. Because a goal of pyrolysis and related reactions is to deoxygenate the pyrolysis oil, one of skill would not believe that adding oxygen to a system (e.g. via an oxidant) would aid in achieving this goal. This, however, is exactly what several embodiments of the invention accomplish.

Accordingly, in another aspect, the present invention provides methods including the steps of providing a feedstock, associating the feedstock with an oxidant to form an oxidized feedstock, associating the oxidized feedstock with one or more of an alkali base, an alkaline earth base, or a base-forming metal oxide to form an oxidized treated feedstock, dewatering the oxidized treated feedstock, heating the dewatered treated feedstock to form a vapor product, and condensing the vapor product to form a pyrolysis oil, wherein the pyrolysis oil contains less than 30% oxygen by weight.

Any of a variety of alkali formates may be used according to various embodiments. It is contemplated that any formate salt that decomposes in between 200° C.-800° C. to form hydrogen and carbon monoxide is within the scope of the present invention. Exemplary alkali formates include calcium formate, magnesium formate, sodium formate, potassium formate, lithium formate, zinc formate, and mixtures thereof.

In yet another aspect, the present invention provides methods including the steps of providing a feedstock, associating the feedstock with an alkali formate in the presence of an oxidant to form an oxidized treated feedstock, dewatering the oxidized treated feedstock, heating the dewatered treated feedstock to form a vapor product, and condensing the vapor product to form a pyrolysis oil, wherein the pyrolysis oil contains less than 30% oxygen by weight.

As will be appreciated by one of skill in the art, in embodiments including an oxidant, the various steps, conditions and reagents used in that embodiment may be as described throughout this disclosure.

Alkali Formates, Formate Salts, and/or Formic Acid

Both FAsP and traditional bio-oil upgrading methods require hydrogen. Formic acid has received much interest as a hydrogen source because of its ability to serve as a hydrogen donor through transfer hydrogenation. The biomass hydrolyzate process used in thermal deoxygenation methods is unique because an appropriate quantity of formic acid is a byproduct of levulinic acid production via acid hydrolysis/dehydration of C6 carbohydrates. Co-production of formic acid from the biomass for FAsP would also be desirable.

As discussed above, embodiments improve upon traditional pyrolysis reactions by providing alkali formate(s), alkali formate salt(s), and/or formic acid and associating the alkali formate(s), alkali formate salt(s), and/or formic acid with a feedstock prior to a pyrolysis reaction. Also as mentioned above, another surprising aspect of various embodiments is that addition of an oxidant to the feedstock prior to other processing can improve the deoxygenation of the downstream pyrolysis oil. Without wishing to be held to a particular theory, it is possible that exposure to an oxidizing agent such as hydrogen peroxide, may allow for a portion of the biomass, such as the carbohydrate component of a particular biomass, to be converted into formic acid or a formate salt.

One example of how a biomass might be oxidized to provide formate salts and thus the desired hydrogen, is found in the oxidation of glucose using hydrogen peroxide. Glucose can be oxidized with 120% $H_2O_2$ under alkaline conditions (1.25 M NaOH or KOH at 250° C. for 1 minute) with conversion to formate at yields approaching 75% of theoretical (6 mol formate per mol glucose, see also Jin et al. (2008), Hydrothermal conversion of carbohydrate biomass into formic acid at mild temperatures. Green Chem., 10(6), 612-615.)

An additional example of how a carbohydrate from biomass can be oxidized to produce a formate salt and free hydrogen, is as follows:

$$\tfrac{1}{3}C_6H_{12}O_6 + \tfrac{1}{3}H_2O + O_2 \rightarrow 2HCOOH \quad (1)$$

$$CaO + 2HCOOH \rightarrow Ca(OOCH)_2 + H_2O \quad (2)$$

$$Ca(OOCH)_2 \rightarrow CaCO_3 + CO + H_2 \quad (3)$$

$$CaCO_3 \rightarrow CaO + CO_2 \quad (4)$$

In reaction (1), formic acid is produced by oxidation of cellulose by molecular oxygen. Next, in (2), the formic acid is combined with calcium oxide to make a formate salt, calcium formate. Then in (3), the calcium formate is exposed to high temperatures and decomposes to form calcium carbonate, carbon monoxide, and hydrogen. Continued exposure to high temperatures can then convert the calcium carbonate to decompose further into calcium oxide and carbon dioxide, as shown in (4). In some embodiments, reactions (1)-(4) could also occur simultaneously or substantially simultaneously, such as when a basic cation is present during the oxidation of cellulose in this example.

In some embodiments, it is also possible to generate formate/formic acid without the use of an externally supplied oxidant. An example of the formation of formate without the presence of externally supplied oxidants is during high temperature aqueous alkaline treatment of lignocellulosics, such as Kraft and soda pulping. The typical formate content in spent Kraft pulping liquor is 6-9% (w/w) based on dissolved wood organics (Niemelä, K., Alen, R. *Analytical Methods in Wood Chemistry, Pulping and Papermaking*, Springer Series in Wood Science, 1999, p. 196). The main mechanism of formate formation is a series of alkaline degradation reactions starting with cleavage of the reducing end of degraded sugars by alkaline attack. Another route of formate formation during pulp production is oxidation of lignin at alkaline aqueous conditions with pressurized oxygen during a process called oxygen delignification of pulp fibers which typically follows after the fibers are released from wood by pulping. At temperatures of about 100° C. the ring structure of lignin is opened forming muconic acid-type compounds which split off formate upon further oxidation (Kuitinen et al., *Holzforschung*, vol. 65, pp. 587-599, 2011). Therefore, by subsequent oxidation of alkaline spent liquor reinforced with additional alkali at about 100° C., the formate content may be further increased before pyrolysis of the remaining organics in this biomass derived stream.

In some embodiments, it is also possible to utilize char produced via pyrolysis, thermal deoxygenation or any other process, to provide carbon monoxide for use in producing formic acid. An exemplary way to utilize such char is through gasification of the char into carbon monoxide (CO), such as by exposing the char to temperatures of approximately 800° C. In turn, the CO produced from char may allow for creation of formic acid through addition of methanol according to the following formula:

$$CO + CH_3OH \rightarrow HCOOCH_3 \quad (1)$$

$$HCOOCH_3 + H_2O \rightarrow CH_3OH + HCOOH \quad (2)$$

In some embodiments, the oxidant is selected from the group consisting of hydrogen peroxide, ozone, oxygen, peracids, and combinations thereof. However, it is specifically contemplated that any oxidant capable of producing formic acid, formate salts, or alkali formates from carbohydrates and/or lignin under basic conditions is within the scope of the present invention.

Formate-Assisted Thermal Deoxygenation

In addition to pyrolysis reactions, certain embodiments may be used to enhance thermal deoxygenation reactions as well. Thermal deoxygenation is a series of processes involving the conversion of carboxylic acids into high energy density, low oxygen content liquid fuels. Briefly, thermal deoxygenation involves the hydrolysis and dehydration of biomass into one or more organic acids, such as levulinic acid. Once these acids are produced, they are then neutralized and converted into alkali metal carboxylic salts. These salts are then heated in the absence of oxygen to high temperature conditions, such as 350° C.-550° C., though any of the temperature ranges described elsewhere herein may be applicable. As the organic acids heat up, coupling reactions occur wherein the organic anions of the salts will couple together to form a ketone and an alkali metal carbonate, such as $CaCO_3$. Through thermal deoxygenation, carboxylate anions and organic residuals may undergo additional deoxygenation reactions, resulting in compounds with oxygen content lower than the ketones that result from simple coupling reactions.

While the recent discovery of thermal deoxygenation processes was a significant advancement in the production of bio-fuels, the present invention improves upon this method even further. Specifically, in some embodiments, including an alkali formate in the mixture of alkali metal carboxylate salts will enhance the quality of the final product, in some cases reducing the oxygen content of the resultant bio-oil to near zero. An example of such a process is found in Example 2 below and shown in FIG. 7.

Further examples of thermal deoxygenation processes within the scope of this aspect of the invention are found in U.S. Patent Application Publication No. 2012/0203043, the disclosure of which is hereby incorporated by reference in its entirety.

Pyrolysis and thermal deoxygenation share several similarities, including processing or treating a feedstock (such as a biomass feedstock), heating the processed or treated feedstock, and condensing the resultant vapors. However, a key difference in several embodiments is that thermal deoxygenation requires that the processing of a feedstock, such as a biomass feedstock, be hydrolyzed and dehydrated under strong acidic conditions to form one or more carboxylic acids, which are then heated and condensed while pyrolysis as herein described does not require the initial hydrolysis and dehydration of the feedstock.

EXAMPLES

Example 1

Deoxygenation of Lignin

This example shows how the addition of formic acid to a lignin feedstock prior to pyrolysis provides distinct improvements over previous methodologies. The starting materials for this example included a lignin, Indulin AT (Mead Westvaco, >400 μm), reagent grade formic acid (>90%), and reagent grade calcium hydroxide (>98%). Indulin AT is formed by further acid hydrolysis of Kraft lignin. In this process, the sodium and hemicelluloses are completely removed, however sulfur is still present. The ultimate composition and HHV of Indulin AT is given in Table 1.

TABLE 1

Analysis of Lignin (Indulin AT)

| | |
|---|---|
| C (wt %) | 64.46 |
| H (wt %) | 5.42 |
| N (wt %) | 1.01 |
| O (wt %) | 24.72 |
| Cl (ppm) | 120 |
| S (wt %) | 1.85 |
| ash (wt %) | 2.43 |
| moisture (wt %) | 3.77 |
| HHV (MJ/kg) | 29.1 |
| O/C[a] | 0.25 |
| H/C[a] | 0.93 |

For this example, the feedstock was prepared as follows. Lignin, 120 g, was mixed with 30 g of calcium hydroxide in 600 mL of water under stirring at 60° C. for 1 hr. Next, 60 or 120 g of formic acid (FA) was added to the mixture, lowering the pH to 3. After one hour the pH stabilized at 4.2. The mixture was then neutralized with 30 g of calcium hydroxide. This solution was then allowed to dry in an oven at 100° C. The resulting solid material was ground and sieved to <425 μm.

Fast-pyrolysis experiments were carried out in an entrained flow reactor, which measured 3.75 cm in inner diameter by 30 cm length. For this example, a heat transfer medium like sand was avoided due to difficulties with lignin agglomeration. The temperature in the reactor was monitored using two K-type thermocouples located on the vertical axis measured 3.0 and 9.5 inches from the top of the reactor. Runs were carried out at 500° C. The lignin/calcium formate mixture was metered through a screw feeder and fed into the reactor pneumatically, using nitrogen flow rate of 6 L/minute. Approximately 300 g of lignin/calcium formate was pyrolyzed in the continuous entrained flow reactor at a feed rate of 1-2 gm/min. Char was separated using a hot gas filter immediately after the reactor at 500° C. In a longer experiment, 1 kg of feed was processed over a 6-hour period to demonstrate process robustness. Liquid was collected in a condenser operated at 4° C. and an electrostatic precipitator (ESP) in series after the vapor passed through the hot gas filter.

Thermogravimetric analysis (TGA) was performed with a TA instruments QA500 instrument. Samples of 10 mg were placed on platinum pans. Nitrogen (liquid $N_2$ boil-off) flowing at 20 standard cubic centimeters per minute was used as the decomposition atmosphere. The samples were heated from room temperature to 1000° C. at a heating rate of 10° C./min. Additional analysis included $^{13}C$ nuclear magnetic resonance (NMR), gas chromatography-mass spectrometry (GC-MS), bomb calorimetry and combustion analysis.

Results

Figure 2:
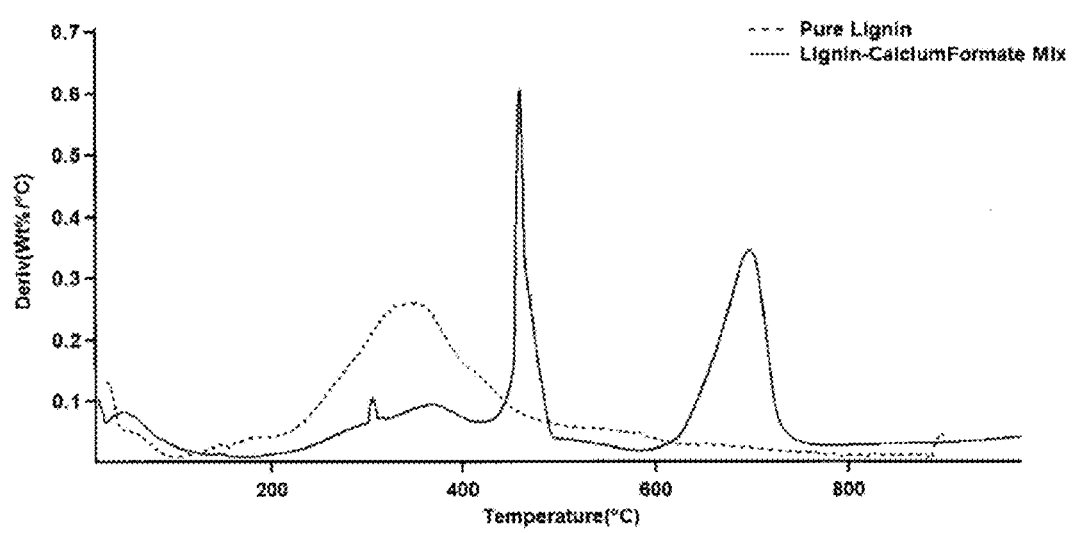
FIG. 2 shows a thermogravimetric analysis of lignin and a lignin/calcium formate mixture with a ramp rate of 10° C./min.

The pyrolysis characteristics of lignin and a lignin/calcium formate mixture used in pyrolysis experiments are shown in the TGA data of FIG. 2. The lignin sample pyrolyzed over a broad temperature range from 200-600° C., as observed in the weight loss and derivative curves. The lignin/calcium formate mixture similarly showed a broad decomposition starting at approximately 200° C. Also seen in the data are the decomposition of the formate salt at approximately 420° C. into calcium carbonate, hydrogen and carbon monoxide, as well as the subsequent decomposition of calcium carbonate into calcium oxide at approximately 600° C. The decomposition of the formate salt occurs well within the range of lignin pyrolysis, providing an in-situ source of reactive hydrogen during pyrolysis.

In the pyrolysis of lignin, steps were taken to carefully feed the lignin into the high-temperature pyrolysis reactor. Lignin melts at temperatures near 200° C. yet requires elevated temperatures to pyrolyze. In addition, a hard skin forms on the lignin surface as it pyrolyzes, trapping volatiles, resulting in significant particle swelling. If particles melt and agglomerate, large solid particles can form, resulting in reactor plugging. Previous methods to cope with reactor plugging include diluting the feed (and feed rate) and applying high heating rates. However, despite these efforts, long, pyrolysis runs of several hours were still not possible. In this example, no significant issues with agglomeration were observed for lignin/calcium formate feeds at feed rates of 1-2 gm/min into a 3.75 cm diameter reactor over the course of several hours. Through the two-hour runs no pressure increase was observed between the reactor and feed hopper, an important predictor of feed/reactor plugging, in contrast to previous lignin experiments.

Pyrolysis was carried out at 500° C. with a N2 flow rate of 6 standard L/minute (gas residence time of approximately 3 sec at standard conditions). Table 2 shows the solid/liquid/gas yields for both the lignin and lignin/calcium formate pyrolysis. Liquid yields for lignin pyrolysis are typically lower than yields for whole biomass. Our yields were well within the range reported by others. Significantly more water was formed during pyrolysis of the lignin/calcium formate feed. The char fraction of this feed was calculated on a calcium carbonate-free basis. The organic liquid separated from the aqueous phase in the condenser for the formate-based feed. The analyses of the organic fractions of the liquids for pyrolysis runs of feeds containing pure lignin, formate feedstock 1 (0.5 g FA/g lignin) and formate feedstock 2 (1 g FA/g lignin) are shown in Table 2. During pyrolysis of pure lignin, the O:C ratio of lignin feed decreased from 0.25 to 0.19, indicating oxygen loss primarily through $CO_2$ formation, as the H:C ratio remained the same. Adding formic acid in the form of calcium formate to the lignin feed substantially decreased the O:C ratio in the oils produced. The O:C ratios for formate feedstocks 1 (0.5 g FA/g lignin) and 2 (1 g FA/g lignin) were 0.14 and 0.067, respectively. Also, the H:C ratio increased in these samples from an original value of 1.01 to 1.23 and 1.40, respectively. The higher heating values of the oils also increased with decreased O:C and increased H:C as shown in Table 2. A value as high as 41.7 MJ/kg was measured (water free basis) for the oil prepared from feedstock 2. In addition, the weight fraction of carbon from the original lignin retained in the organic oil increased from 23.4 to 28.6% when increasing the formic acid concentration in the feed.

TABLE 2

Analysis of Pyrolysis Products for Different Feedstocks

| feed | lignin | lignin/Ca(OH)$_2$ | 0.5 g of FA/g of lignin | 1 g of FA/g of lignin |
|---|---|---|---|---|
| liquid yield (wt %) | 23.0 | 23.3 | 28.5 | 32.5 |
| char yield (wt %) | 41.0 | 38.5 | 38.7 | 34.8 |
| gas yield (wt %) | 39.0 | 38.2 | 32.8 | 32.7 |
| C yield in oil (wt %) | 21.3 | 20.4 | 23.4 | 28.6 |
| O/C[a] | 0.19 | 0.21 | 0.14 | 0.067 |
| H/C[a] | 0.96 | 0.97 | 1.23 | 1.4 |
| HHV (MJ/kg)[a] | 30.7 | 32.1 | 37.2 | 41.7 |

[a]Dry basis.

The decomposition of 1 mol calcium formate produces 2 mol of atomic hydrogen, 1 mol of carbon monoxide, and 1 mol of calcium carbonate. It is unlikely that carbon from the calcium formate contributes to the carbon in the hydrocarbon oil produced from pyrolysis. The hydrogen however, is highly reactive and has been shown to clearly remove oxygen and hydrogenate during biomass decomposition. In our experiments, assuming complete decomposition of formate, we have theoretically provided 0.2 and 0.4 mol of atomic hydrogen per mole of carbon in the feedstock. Because pyrolysis of our lignin without formate results in some deoxygenation, it is difficult to quantify the efficiency of hydrogen consumption. However, the amount deoxyhydrogenation that occurred relative to the amount of formate added is considerable, considering the reaction conditions (100 bar, 623 K) needed to achieve hydrodeoxygenation in post-processing of lignin bio-oils using precious metal catalysts, for example. In addition, a previous study used approximately 15:1 (wt/wt) formic acid to lignin in solvolysis of lignin to achieve high levels of deoxyhydrogenation similar to those seen in this example.

The results for $^{13}$C NMR analysis are compiled in Table 3 showing the integrated areas of the NMR spectra over specific regions associated with chemical functionalities. Adding calcium formate to the lignin feed prior to pyrolysis resulted in an increase in aromatic fraction of the oil as well as a significant decrease in methoxy/hydroxy functionalities, as oxygen was removed from the oil.

TABLE 3

$^{13}$C NMR Integrations

| type of carbon | chemical shift (ppm) | pure lignin | lignin/ Ca(OH)$_2$ | formate/ lignin (0.5 g/g) | formate/ lignin (1 g/g) |
| --- | --- | --- | --- | --- | --- |
| carbonyl | 215-160 | 1.1 | 0 | 2.9 | 0.2 |
| aromatic | 160-102 | 74 | 76.6 | 83 | 87.1 |
| carbohydrate | 102-70 | 0.1 | 0 | 0.8 | 0 |
| methoxy/ hydroxy | 70-54 | 14.4 | 12.9 | 0.6 | 0.9 |
| alkyl hydrocarbon | 54-1 | 10.4 | 10.5 | 12.8 | 11.8 |

Figure 3:
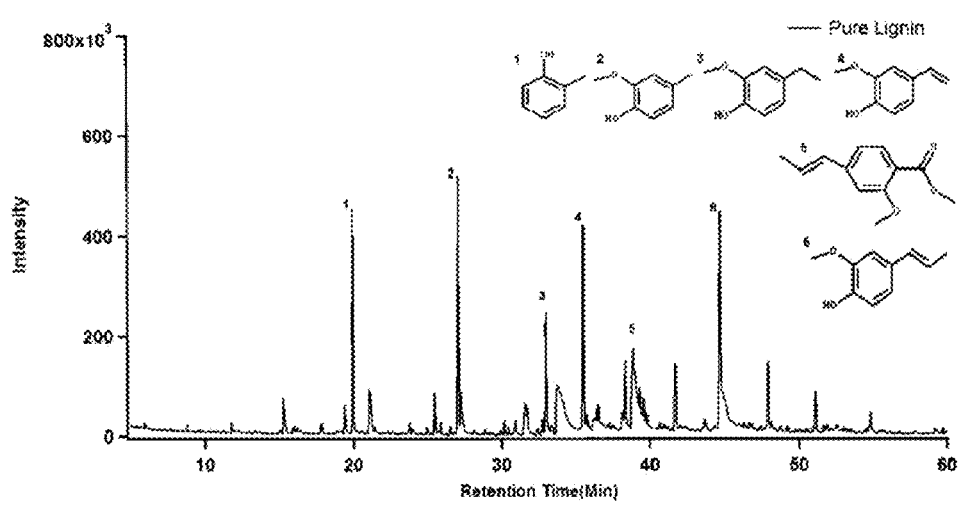
FIG. 3 shows a gas chromatography-mass spectrometry (GC-MS) analysis of oil obtained from pyrolysis of lignin.
Figure 4:
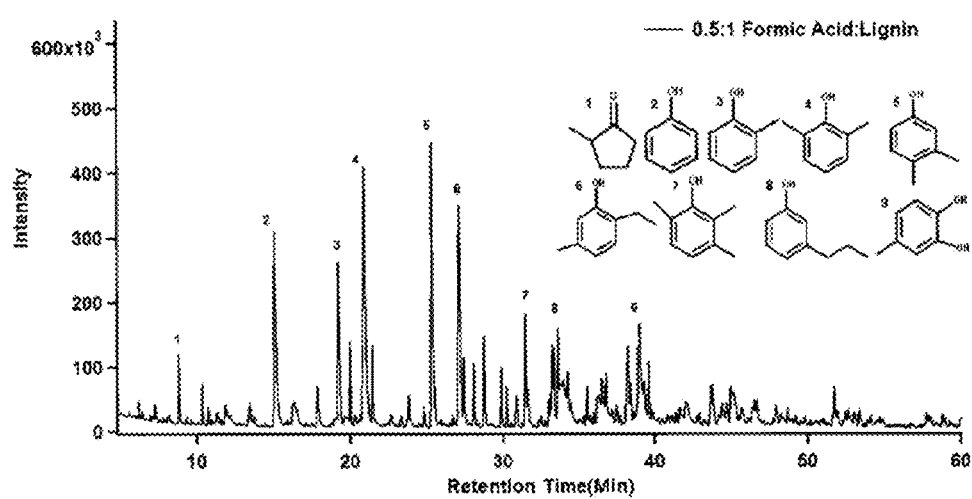
FIG. 4 shows a GC-MS analysis of oil obtained from pyrolysis of a lignin/formic acid mixture (0.5 g formic acid/1 g lignin).
Figure 5:
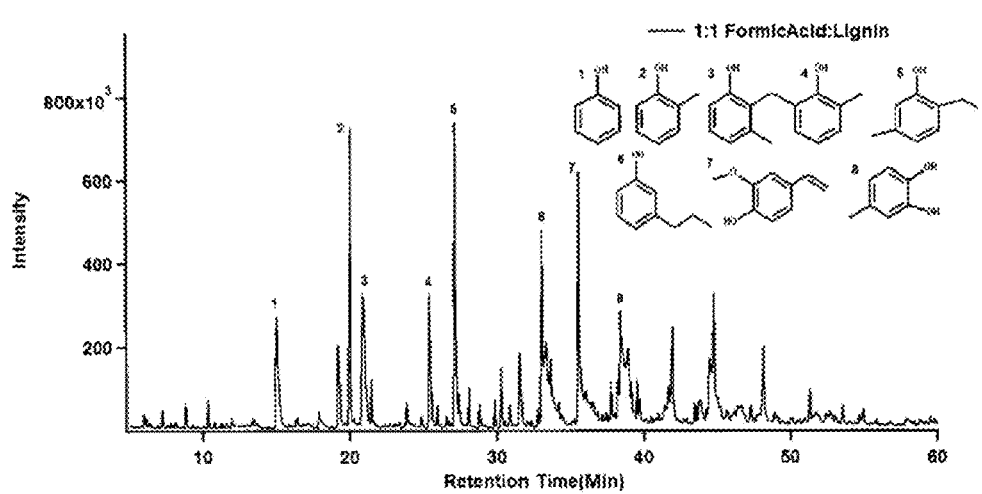
FIG. 5 shows a GC-MS analysis of oil obtained from pyrolysis of a lignin/formic acid mixture (1 g formic acid/1 g lignin).

FIG. 3 shows the GC-MS analysis of the organic oil obtained from fast pyrolysis of the pure lignin feedstock. Major peaks include highly oxygenated phenols including those with methoxy functionalities expected from lignin pyrolysis. In contrast, the GC-MS analyses of the oils produced from lignin/calcium formate mixtures, in FIGS. 4 and 5, revealed significant quantities of alkylated phenols. $^{13}$C NMR analysis also revealed a decrease in methoxy/hydroxy functionalities when adding calcium formate to the feed. In addition, $^{13}$C NMR analysis indicated an increase in aromatics with increased calcium formate in the feed. It appears from the data that the deoxyhydrogenation from formate decomposition was successful in eliminating significant methoxy functionality from guaiacol-like compounds. The increase in the fraction of carbon (from the original lignin) in the organic oil from formate-assisted pyrolysis also suggests that the removal of reactive methoxy-phenol compounds, slightly reduced coking reactions. In other words, the pyrolysis pathway to coke formation was reduced or bypassed via in-situ deoxyhydrogenation in formate-assisted pyrolysis.

Conclusion

This example shows that formate-assisted pyrolysis is an effective method for reducing oxygen content in biomass-derived liquids without the need for catalysts. Here, we demonstrated the application of formate-assisted pyrolysis to lignin, a feedstock that presents unique challenges to pyrolysis processing. When adding modest amounts of formic acid in the form of a metal salt, oxygen was removed from the lignin during pyrolysis by deoxyhydrogenation, facilitated by the hydrogen generated during the co-decomposition of calcium formate, in-situ. This was achieved, in part, from the co-precipitation of lignin and calcium formate, creating a molecularly-mixed feed. Liquid yields as high as 33% containing an oil product with a higher heating value of 41.7 MJ/kg, an O:C of 0.067 and containing largely aromatics was produced. Initial data suggest that higher liquid yields could be possible, depending upon formate concentration and optimizing residence times within the pyrolysis reactor. Additionally, feed/agglomeration issues with the lignin appeared mitigated. Relative to other methods, formate-assisted pyrolysis does require the addition of formic acid or a formate salt to the process (calcium can be recycled). However, it is possible that other processes within a biorefinery can produce formic acid or a formate salt, and advantages include atmospheric pressure operation, continuous operation, and no catalysts. This method could be extended to other biomass feedstocks in upstream processing strategies.

Example 2

Formate Assisted Pyrolysis of Pine Sawdust

Feedstock Preparation

Calcium formate was incorporated into the biomass feedstock by mixing calcium hydroxide and formic acid in water to form the salt, then adding pine sawdust to the solution in a 1:1 or 1:12.7 weight ratio of formate ion/pine. For the blank calcium hydroxide experiments, pine sawdust was added to a suspension of Ca(OH)$_2$ and water in the same mole ratio of calcium/pine as in the calcium formate experiments. In both cases, the pretreated pine was dried and sieved to a maximum size of 1.5 mm. Table 4 shows some characteristics of the pine sawdust feedstock.

TABLE 4

| Pine Sawdust (Feedstock) Analysis | |
| --- | --- |
| Moisture (%) | 10-13 |
| Ash (%) | 0.309 |
| C | 0.451 |
| H | 0.068 |
| N | <0.005 |
| O | 0.481 |
| HHV (MJ/kg) | 18.07 |

Pyrolysis

The prepared feeds were pyrolyzed in an 3.5 cm×30 cm fluidized bed reactor with 40-60 mesh sand as heat transfer media. The reactor temperature was measured using two K-type thermocouples located on the vertical axis measured 3.0 and 9.5 in. from the top of the reactor. The pine/calcium formate mixture was metered through a screw feeder and fed into the reactor pneumatically, using a nitrogen flow rate of 6 L/min. The feed rate of the mixture was approximately 0.5 kg/hour and up to 800 grams of material could be processed in a particular run. In this example, the pyrolysis temperature was 500° C. Downstream of the reactor, char was separated using a hot-gas filter also maintained at 500° C. After the vapor passed through the hot-gas filter the liquid was collected in a condenser operated at 6° C. and then an electrostatic precipitator (ESP).

The liquid yield was measured for several FAsP runs by mass collected in the condenser and electrostatic precipitator. The solid char yield was calculated assuming the complete conversion of Ca in the calcium formate to calcium carbonate which was subtracted from the solid mass weighed. The gas yield was computed by difference. Liquid yields varied from 38 to 47% and were comprised of an organic fraction and aqueous fraction. Oil yield, the fraction of liquid that separated from the aqueous phase, varied between 17 and 25%. The organic fraction was slightly denser and separated from the aqueous fraction.

Ultimate analysis was used to quantify the amount of oxygen removed from the biomass during FAsP as well as determine the carbon yield of the organic oil phase from the biomass. Table 5 shows several results using various amounts of formate and pyrolyzing temperatures. Oxygen levels in the organic fraction of the bio oils were as low as 7 wt %. The energy yields based on higher heating values varied between 33-49%. Compared to alternate one-step catalytic pyrolysis processes published, the FAsP yields are considerably higher.

TABLE 5

Exemplary Results Using Pine Sawdust Feedstock
Pine FAsP Data

| Temp (° C.) | Aq. Yield | Oil yield | H$_2$O in Oil | HHV MJ/kg | HHV corr | O wt % | Energy Yield |
|---|---|---|---|---|---|---|---|
| 1.4 gm formate/1 gm pine | | | | | | | |
| 450 | 52.6 | 17.4 | 6.5 | 33.9 | 36.3 | 19.7 | 28.4 |
| 450 | 44.5 | 19.7 | 6.8 | 32.9 | 35.3 | 17.4 | 31.2 |
| 475 | 46 | 18 | 8.1 | 34.1 | 37.1 | 17.5 | 29.6 |
| 475 | 44.2 | 19.7 | 8.2 | 35.9 | 39.1 | 17.5 | 34.1 |
| 500 | 34.6 | 11 | 8.9 | 36.7 | 40.3 | 6.9 | 19.5 |
| 500 | 32 | 14.8 | 7.9 | 36.8 | 40.0 | 10.3 | 26.2 |
| 500 | 40.3 | 16.8 | 7.6 | 35.8 | 38.7 | 9.3 | 29.0 |
| 500 | 44.4 | 14.7 | 7.5 | 37.1 | 40.1 | | 26.3 |
| 525 | 46.6 | 11.3 | 8.4 | 38.2 | 41.7 | 7.6 | 20.8 |
| 0.116 gm formate/1 gm pine | | | | | | | |
| 500 | 41.1 | 17.4 | 7.7 | 33.9 | 36.7 | 18 | 30.8 |
| 500 | 30.7 | 16.5 | 7.6 | 33.3 | 36.0 | 16.8 | 28.7 |

Example 3

Integration of Alkali Carbonylation for Production of Alkali Formate for Use in Formate Assisted Pyrolysis and Thermal Deoxygenation As described above, adding formic acid or an alkali formate, such as calcium formate, to biomass prior to pyrolysis enhances the quality of the pyrolysis oil that is produced. The addition of formate into the pyrolysis reaction reduces the oxygen content of the resulting oil, increases its energy density and renders the oil more hydrophobic, all desirable characteristics in fuel oils. Because the process works without the addition of gaseous hydrogen or the use of heterogeneous catalysts, the process is greatly simplified compared to competing technologies for improving the fuel qualities of biomass pyrolysis oils. The alkali cation used in the process, such as calcium ion, emerges from the pyrolysis as a carbonate salt and can be recycled through the process by calcining the carbonate salt back to an alkali base, such as calcium oxide. An issue with implementing this technology is the need for an abundant and inexpensive source of formate to produce the alkali formate salt.

In this example, a process is described wherein a carbon rich char, formed from the pyrolysis process, is used to generate formic acid through a partial combustion of the char to carbon monoxide followed by alkali carbonylation to alkali formate.

Production of Carbon Monoxide

Carbon monoxide (CO) is a commonly produced and used industrial chemical. It is easily generated from organic materials, such as biomass, by incomplete combustion with limited oxygen. In the context of a biorefinery, waste carbon materials, such as lignin, black liquor, pyrolysis char, hydrolysis char, biomass quality wood or hog fuel could serve as a source for CO. Partial combustion of carbon to CO releases heat, which can be used in the biorefinery to provide energy to other unit operations. In this way, processes deploying TDO or FAsP could use their unconverted carbon residues to generate CO, rendering possible a dramatic improvement in the quality of FAsP and TDO oils while also providing heat to other processes.

Alkali Carbonylation

Alkali carbonylation is a process that has been known for decades for the production of alkali formate. Common applications have been for the production of sodium or calcium formate. Alkali carbonylation is a simple process: when carbon alkali formate, as shown in the equation below where calcium hydroxide serves as the alkali hydroxide:

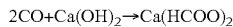

$$2CO+Ca(OH)_2 \rightarrow Ca(HCOO)_2$$

Alkali carbonylation has not been widely used in recent years because there is relatively little demand for alkali formate. In the past alkali formates were used as a feedstock to make formic acid, but this method was uneconomical because of high consumption of other chemicals and waste generation. However, as described herein, it is the inexpensive alkali salt form of formate that is required to enhance pyrolysis reactions, not the more expensive acid form. Thus, while not economical for production of formic acid, alkali carbonylation is a simple and inexpensive means of producing alkali formate for the methods described herein and is contemplated as present in certain embodiments. This process may be particularly advantageous wherein char generated by pyrolysis of biomass is partially combusted to provide some or all of the required CO.

Formate-Assisted Pyrolysis in a Mill or Treatment Plant

Figure 6:
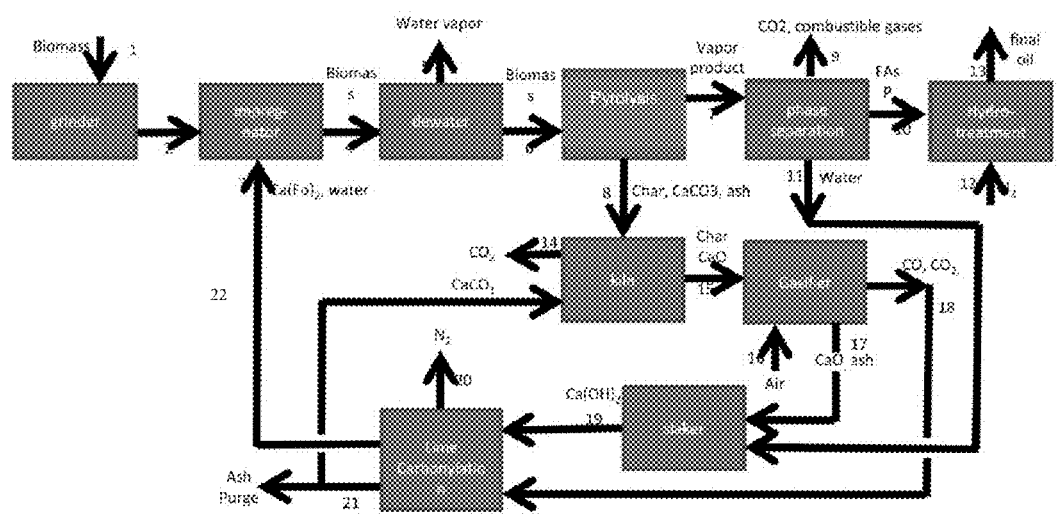
FIG. 6 shows a conceptual flow diagram of certain embodiments as applied to a pyrolysis process.

FIG. 6 shows a conceptual diagram of how certain embodiments might make use of an integrated carbonylation process in a pyrolysis process. Specifically, a feedstock (in this example a woody biomass) enters the system (1), such as delivered as chipped whole wood, with a moisture content of approximately 50%. The biomass is then ground down to a desired size and then sent to an impregnator (2) and impregnated with a solution of calcium formate (Ca(Fo)$_2$). The impregnated biomass is sent for dewatering (4) and dewatered and fed to the formate assisted pyrolysis (FAsP) unit (6), in which it is thermally decomposed and deoxygenated at 450° C. Products leave the FAsP reactor in either solid (8) or vapor (7) streams. The vapor stream is sent to phase separation, where it is condensed, the oil (10) and aqueous (11) phases are allowed to separate and the non-condensible gasses are vented (9). The oil phase can be sent to hydrotreating for upgrading as necessary to meet fuel requirements. The water phase from phase separation is recycled to the lime slaker (11). The solid stream leaving the FAsP includes CaCO$_3$ from the decomposition of Ca(Fo)$_2$ and the char from the biomass. This is sent to a lime kiln to convert the CaCO$_3$ into CaO and CO$_2$. After the kiln (15), the gasifier incompletely combusts char to CO and CO$_2$ (18) in a ratio of 3.5 to 1. The lime slaker converts the CaO coming from the gasifier to Ca(OH)2 and sends this to lime carbonylation (19) to be reacted with CO and CO$_2$ to yield Ca(Fo)$_2$ and CaCO$_3$, respectively. The soluble Ca(Fo)$_2$ is recirculated to the feed impregnator (22) while the insoluble CaCO$_3$ is removed with the ash. A portion of the CaCO₃+ash residue is purged (21) and the remainder fed back to the lime kiln (20). Table 6 shows exemplary assumed conditions in this example.

streams. The vapor stream is sent to phase separation, where it is condensed, the oil (10) and aqueous (11) phases are allowed to separate and the non-condensable gases are vented

TABLE 6

Exemplary Assumed Conditions

| Name | Description | Assumptions |
| --- | --- | --- |
| Grinder | Grind chips to desired size | Incoming wood chips, ~10 mm × 40 mm |
| Impregnator | Permeates wood particles with Ca(Fo)2 | 180° C., 18 bar, 1 hour residence time |
| Formate Assisted Pyrolysis | Thermally decomposes and deoxygenates | 47% yield on wood |
| Condensation | Condenses hydrocarbon liquids and water | 15° C., 1 bar, 1 minute residence time |
| Phase Separation | Condenses and separates into non-condensibles, both oil and aqueous phases | 15° C., 1 bar, 1 hour residence time |
| Lime Kiln | Regenerates CaO from CaCO3, releases $CO_2$ | 650° C., 1 bar, minutes residence time |
| Gasification | Gasifies char to CO (predominantly) and $CO_2$ | 800° C., 1 bar, seconds residence time, CO to $CO_2$ molar ratio of 3.5:1 |
| Slaker | Hydrates CaO to Ca(OH)₂ | 100° C., 1 bar, minutes residence time |
| Lime Carbonylation | Reacts CO + Ca(OH)₂ to Ca(Fo)₂ | 180° C., 18 bar, 1 hour residence time |

Formate Assisted Thermal Deoxygenation in a Mill or Treatment Plant

Figure 7:
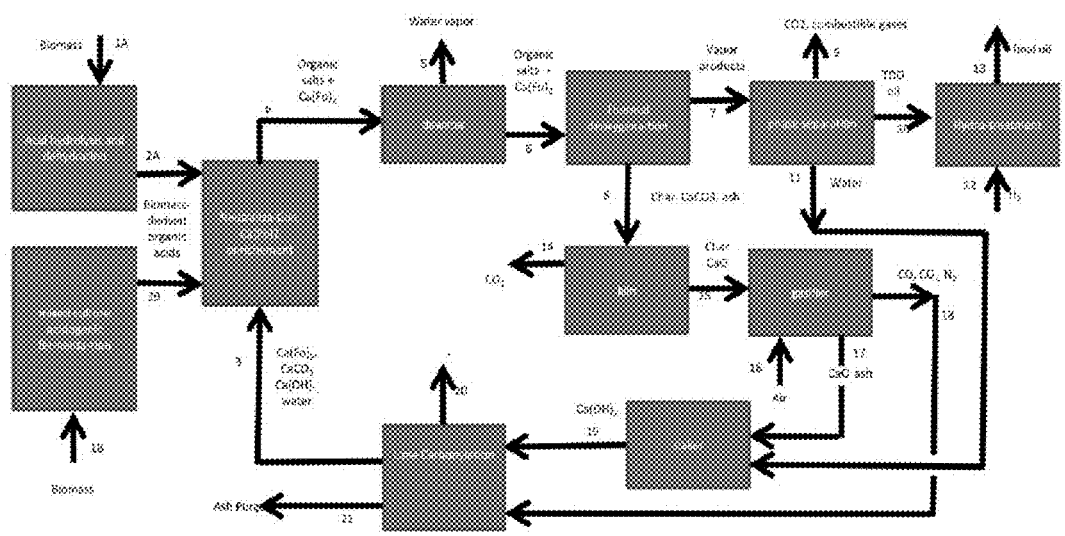
FIG. 7 shows a conceptual flow diagram of certain embodiments as applied to a thermal deoxygenation process.

FIG. 7 shows a conceptual diagram of how certain embodiments might make use of an integrated carbonylation process in a thermal deoxygenation process. Specifically, a feedstock (such as a lignocellulosic biomass) enters the system as chipped or baled material (1A and/or 1B). The feedstock is then either: a) hydrolyzed and dehydrated to form levulinic acid and formic acid (2A), or b) subjected to an alkali pretreatment and acidogenic fermentation, making such acids as acetic, lactic, propionic and butyric acid (2B). The acids are then neutralized with an alkali carbonate and alkali hydroxide and enriched with calcium formate (Ca(Fo)₂). The formate enriched organic salts are de-watered (5) and fed to the thermal deoxygenation unit (6), operating around 450° C. Products leave the TDO reactor in either solid (8) or vapor (7) streams. The vapor stream is sent to phase separation, where it is condensed, the oil (10) and aqueous (11) phases are allowed to separate and the non-condensable gases are vented (9). The oil phase can be sent to hydrotreating for upgrading as necessary to meet fuel requirements. The water phase from phase separation is recycled to a lime slaker. The solid stream leaving TDO reactor includes CaCO₃ from the decomposition of the carboxylate salts and the char from the biomass. This is sent to a lime kiln (8) to convert the CaCO₃ into CaO and $CO_2$. After the kiln, the gasifier incompletely combusts char to CO, with some $CO_2$ (15). The lime slaker converts CaO coming from the combustor (17) to Ca(OH)₂ and sends this to lime carbonylation (19). There it is reacted with CO and $CO_2$ to yield Ca(Fo)₂ and CaCO₃, respectively. A portion of the solids exiting the carbonylation are purged to reduce buildup of ash components in the system (21). The majority of the carbonylation liquids and solids recycled for use in the neutralization and formate enrichment step outlined above for a subsequent batch of feedstock (3). Table 7 shows exemplary assumed conditions in this example.

TABLE 7

Exemplary Assumed Conditions

| Name | Description | Assumptions |
| --- | --- | --- |
| Acid Hydrolysis and Dehydration | Convert 6-Carbon Sugars to Levulinic Acid and Formic Acids | Incoming Wood Chips, ~10 mm × 40 mm |
| Mixed Culture Fermentation | Converts Carbohydrates to Mixed Organic Acids | Alkali Pretreatment Prior to Fermentation, Non-Sterile Operating Conditions |
| Neutralization and Formate Enrichment | Mixing Tank to Neutralize Incoming Acids and Combine with Alkali Formate | 25° C., neutral or high pH |
| Thermal Deoxygenation | Thermally Decomposes and Deoxygenates Organic Salts | 450° C., 1 bar, residence time seconds to minutes, near complete consumption of organic acids |
| Condensation | Condenses Hydrocarbon Liquids and Water | 15° C., 1 bar, 1 minute residence time |
| Phase Separation | Condenses, Separates into Non-Condensibles, Oil and Aqueous Phases | 15° C., 1 bar, 1 hour residence time |
| Lime Kiln | Regenerates CaO from CaCO₃, releases $CO_2$ | 650° C., 1 bar, minutes residence time |

TABLE 7-continued

Exemplary Assumed Conditions

| Name | Description | Assumptions |
|---|---|---|
| Gasification | Gasifies Char to CO (Predominatly) and $CO_2$ | 800° C., 1 bar, seconds residence time, high ratio of CO to CO2 |
| Slaker | Hydrates CaO to $Ca(OH)_2$ | 100° C., 1 bar, minutes residence time |
| Lime Carbonylation | Reacts CO + $Ca(OH)_2$ to $Ca(Fo)_2$ | 180° C., 18 bar, 1 hour residence time |

Example 4

Oxidation of Black Liquor

A northern hardwood chips mixture was used for the production of soda AQ black liquor. The charge conditions were as follows: 0.1% anthraquinone (AQ), 16% effective alkali (EA) as $Na_2O$ (sodium hydroxide charged), 3% sodium carbonate ($Na_2CO_3$), L/W ratio of 3.5, 160° C., and an H-factor of 1000 hours. Two cooks were performed in a rocking digester yielding 9 L of soda AQ black liquor and a pulp with a Kappa number of 17.9.

Several experiments of soda AQ black liquor oxidation with pure oxygen gas were performed in a 300 mL Parr reactor. For each oxidation reaction, approximately 150 g of soda AQ black liquor was charged to the reaction vessel along with varying amounts of NaOH. The reactor was purged three times with pure oxygen at 30-40 psi before heating. The temperature set point for the oxidation was 127° C. for all experiments. Once the internal temperature stabilized at 127° C. for 30 minutes, the reactor was pressurized with pure oxygen. The initial oxygen pressure used was increased as the amount of caustic charged was increased. The reaction was stopped when there was little to no more oxygen consumption. The initial and final pressures were used to calculate the amount of oxygen consumed by the black liquor. The reactor was allowed to cool to approximately 40° C. before releasing the pressure within the reactor and collecting the liquid product for chemical analysis.

The black liquor composition of the original and different oxygen treated black liquor samples are listed in Table 8. The NaOH charge of the different experiments increases up to 83% on dry solids of the untreated, original soda AQ black liquor. The parameters listed in Table 8 are the amount of oxygen consumed, formic and acetic acid formed (present in black liquor as formate and acetate resp.), and Klason lignin and total lignin (sum of Klason +UV lignin) remaining, all expressed both in g/L and as % based on the amount of dry solids in the original black liquor.

TABLE 8

Soda-AQ black Liquor Oxidation with Pure Oxygen

| NaOH charged | $O_2$ consumed | | Formic acid | | Acetic acid | | Klason lignin | | Total lignin | |
|---|---|---|---|---|---|---|---|---|---|---|
| (% orig. BLS) | (g/L) | (% orig. BLS) | (g/L) | (% orig. BLS) | (g/L) | (% orig. BLS) | (g/L) | (% orig. BLS) | (g/L) | (% orig. BLS) |
| 0  | —    | —    | 6.3  | 3.7  | 15.3 | 8.9  | 50.2 | 29.2 | 68.3 | 39.7 |
| 21 | 19.8 | 11.5 | 11.7 | 6.8  | 16.9 | 9.8  | 35.1 | 20.4 | 48.7 | 28.3 |
| 31 | 32.6 | 18.9 | 13.6 | 7.9  | 18.3 | 10.6 | 28.3 | 16.5 | 37.1 | 21.6 |
| 41 | 45.1 | 26.2 | 15.3 | 8.9  | 20.3 | 11.8 | 12.4 | 7.2  | 23.3 | 13.6 |
| 62 | 51.4 | 29.9 | 18.5 | 10.8 | 20.5 | 11.9 | 6.5  | 3.8  | 24.5 | 14.2 |
| 83 | 54.6 | 31.8 | 21.4 | 12.5 | 21.7 | 12.6 | 6.8  | 3.9  | 24.4 | 14.2 |

BLS = black liquor solid

Table 8 shows that the original black liquor contains 3.7% formic acid (based on dry solids of the original black liquor) which is produced during pulping as a result of the alkaline degradation reactions of the dissolved carbohydrates (K. Niemela and R. Alen, "Characterization of Pulping Liquors," in *Analytical Methods in Wood Chemistry, Pulping, and Papermaking*, Berlin, Springer, 1999). With increasing charge of NaOH the amount of oxygen consumed increases as well as the formic and acetic acid concentration, while the amount of Klason lignin decreases.

Figure 8:
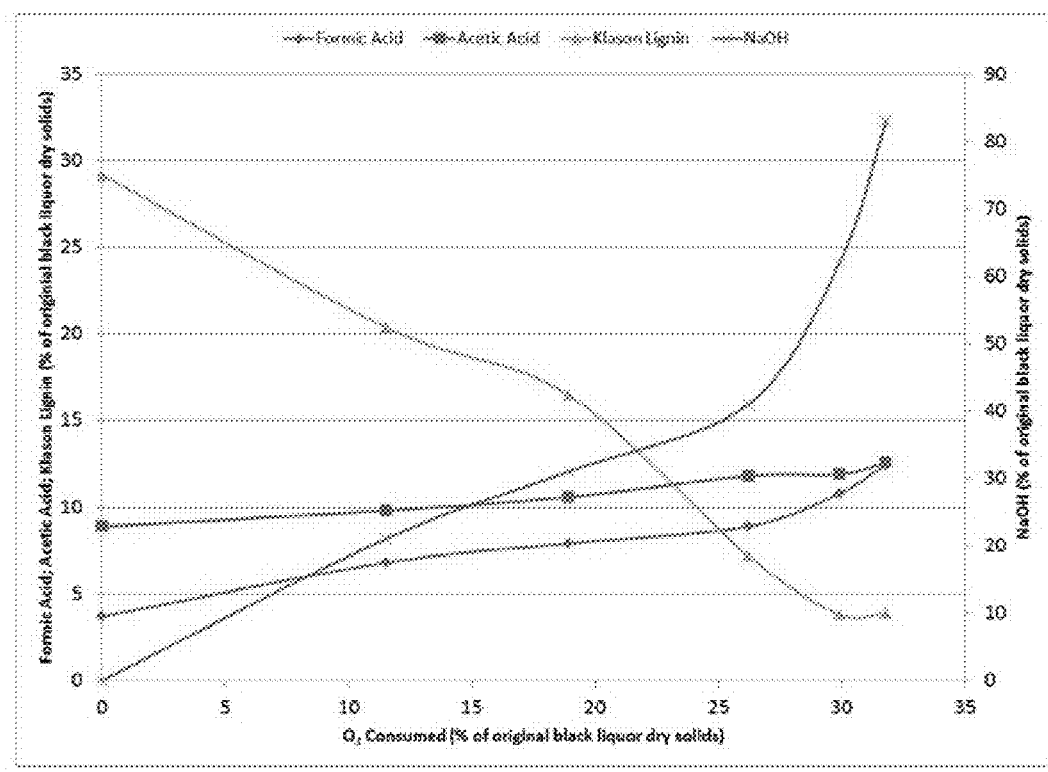
FIG. 8 shows a graph of: formic and acetic acids formed during oxidation of black liquor, Klason and total lignin remaining after oxidation of black liquor, and $O_2$ consumed, each expressed as a percentage based on the amount of dry solids in the original black liquor feedstock.

FIG. 8 shows the data underlying Table 8 plotted versus percentage of oxygen consumed (based on dry solids of the original black liquor) in order to better visualize the chemical changes.

It can be seen that the amount of formic and acetic acid increases approximately linearly with oxygen consumption up to about 30% consumed (dry solids basis), with a corresponding decrease in Klason lignin content. Without wishing to be held to a particular theory, this suggests that the formate generated during oxidation is formed from lignin oxidation. It also shows that the amount of formic acid increases trifold when 30% of oxygen is consumed.

This example shows, among other things, that oxidation of a feedstock, here black liquor, can provide a significant source of formic acid which can be used in pyrolysis or thermal deoxygenation reactions, for example, as described herein.

Example 5

Oxidation of Glucose, Cellulose, Xylan, and Xylose

Cellulose (Aldrich cellulose monocrystaline powder) and xylan from beechwood (Tokyo Chemical Industry) were oxidized using hydrogen peroxide under basic conditions to demonstrate the potential for producing formate salts from those fractions of biomass. The oxidant was stabilized hydrogen peroxide for analysis, 35 wt % solution in water from Acros Organics. Slaked lime calcium hydroxide was the alkaline component in all reactions, and high-performance liquid chromatography (HPLC) grade water was used where water was required. Sulfuric acid solutions, used as eluents and diluents in HPLC analysis, were produced with Acros Organics Sulfuric Acid Extra Pure 96% and HPLC grade water.

Reactions were carried out in a 15 mm long cylindrical stainless steel reactor with 1 mm walls and an inner diameter of 0.95 cm (⅜"), resulting in a reactor volume of approximately 11.78 cm³. A Techne SBL-2D Fluidized Temperature Bath coupled with a Eurotherm TC-8D temperature controller was used to bring the reactor to, and carry out reactions at, the desired temperature. An ice bath was then used to halt the reaction after a specific reaction time. HPLC analysis utilized a Bio-Rad Aminex HPX-87H column.

After reactants were massed into the tubular reactor, suspending the reactor horizontally in a fluidized sand bath allowed reactions take place at the required temperature. Calcium formate was measured by HPLC as formic acid concentration after adjusting the pH and concentration of the samples using sulfuric acid. If solids were visible in the samples, they were centrifuged prior to dilution. Concentrations of formic acid, acetic acid, glycolic acid, lactic acid, arabinose, xylose, and glucose were quantified. Design of experiments included 27 oxidation reactions to explore the single variable effects of reaction times (time), reaction temperatures (temperature), percent $H_2O_2$ supply ($H_2O_2$), and concentrations of calcium hydroxide (molarity) on calcium formate productivity. The reaction times ranged from 0-120 seconds, the temperatures ranged from 150-350° C., the peroxide charge was varied from 0-580% of theoretical requirement, and the $Ca(OH)_2$ molarity was varied from 0.5-1.5 molar.

There is the potential to produce one mole of formic acid per mole of carbon in the carbohydrate feed stock. Therefore we have defined calcium formate productivity on a carbon basis and calculated from formic acid concentrations determined by HPLC analysis as $$\text{Formate Productivity} = \frac{[FA_{final}]}{[C_{initial}]} * 100\% \quad (1)$$

Where $[FA_{final}]$ is the molar concentration (mol/L) of formic acid produced via the oxidation reaction, calculated from HPLC analysis of each sample, and $[C_{initial}]$ is the initial molar concentration (mol/L) of carbohydrate carbon atoms included in the reaction.

Calcium formate productivity is expressed as a percent value and is the ratio of the amount of calcium formate produced to the maximum calcium formate production allowed by the carbohydrate supplied. In equation 1, it is important to note that unlike fractional yield which is traditionally calculated based on quantity produced divided by quantity consumed, productivity in the current case implies complete conversion of the carbohydrate. However, the fractional conversion was not determined for cellulose or xylan experiments due to the difficulties in measuring the conversion of the polysaccharides. Maximum formate productivity was 12% for both cellulose and xylan, thus demonstrating the ability to convert at least a fraction of these biomass components to formate salts.

This example shows, among other things, that oxidation of significant biomass constituents, here cellulose and xylan, can provide a significant source of formic acid which can be used in pyrolysis or thermal deoxygenation reactions, for example, as described herein.

EQUIVALENTS AND SCOPE

Those skilled in the art will recognize, or be able to ascertain using no more than routine experimentation, many equivalents to the specific embodiments of the invention described herein. The scope of the present invention is not intended to be limited to the above Description, but rather is as set forth in the following claims:

We claim:
1. A method comprising
   providing a feedstock;
   associating the feedstock with a formate to form a treated feedstock;
   dewatering the treated feedstock;
   heating a dewatered treated feedstock to form a vapor product; and
   condensing the vapor product to form a pyrolysis oil;
   wherein the pyrolysis oil contains less than 30% oxygen by weight,
wherein each of the associating, dewatering, heating and condensing steps is carried out at a pressure between about vacuum and about 10 bar,
   wherein the feedstock is selected from the group consisting of cellulosic biomass, wood, wood waste, lignin, spent pulping liquors, cellulosic food waste, soluble cellulosic component of municipal solid waste, and mixtures thereof, and
   wherein the formate is selected from the group consisting of calcium formate, magnesium formate, sodium formate, potassium formate, lithium formate, zinc formate, and mixtures thereof.
2. The method of claim 1, wherein the dewatered treated feedstock is heated to between about 200° C. and about 600° C.
3. The method of claim 1, wherein the dewatered treated feedstock is heated to between about 375° C. and about 500° C.
4. The method of claim 1, wherein the dewatered treated feedstock is heated for between about one second and about four hours.
5. A method comprising
   providing a feedstock;
   associating the feedstock with an oxidant to form an oxidized feedstock;
   associating the oxidized feedstock with a formate to form an oxidized treated feedstock;
   dewatering the oxidized treated feedstock;
   heating the dewatered treated feedstock to form a vapor product; and
   condensing the vapor product to form a pyrolysis oil;
   wherein the pyrolysis oil contains less than 30% oxygen by weight,
   wherein each of the associating, dewatering, heating and condensing steps is carried out at a pressure between about vacuum and about 10 bar, wherein the feedstock is selected from the group consisting of cellulosic biomass, wood, wood waste, lignin, spent pulping liquors, cellulosic food waste, soluble cellulosic component of municipal solid waste, and mixtures thereof, and wherein the formate is selected from the group consisting of calcium formate, magnesium formate, sodium formate, potassium formate, lithium formate, zinc formate, and mixtures thereof.

6. The method of claim 5, wherein the oxidant is selected from the group consisting of hydrogen peroxide, ozone, oxygen, peracids, and combinations thereof.

7. The method of claim 5, wherein the dewatered treated feedstock is heated to between about 200° C. and about 600° C.

8. The method of claim 5, wherein the dewatered treated feedstock is heated to between about 375° C. and about 500° C.

9. The method of claim 5, wherein the dewatered treated feedstock is heated for between about one second and about four hours.

10. A method comprising
providing a feedstock;
associating the feedstock with a formate in the presence of an oxidant to form an oxidized treated feedstock;
dewatering the oxidized treated feedstock;
heating a dewatered treated feedstock to form a vapor product; and
condensing the vapor product to form a pyrolysis oil;
wherein the pyrolysis oil contains less than 30% oxygen by weight,
wherein each of the associating, dewatering, heating and condensing steps is carried out at a pressure between about vacuum and about 10 bar,
wherein the feedstock is selected from the group consisting of cellulosic biomass, wood, wood waste, lignin, spent pulping liquors, cellulosic food waste, soluble cellulosic component of municipal solid waste, and mixtures thereof, and
wherein the formate is selected from the group consisting of calcium formate, magnesium formate, sodium formate, potassium formate, lithium formate, zinc formate, and mixtures thereof.

11. The method of claim 10, wherein the oxidant is selected from the group consisting of hydrogen peroxide, ozone, oxygen, peracids, and combinations thereof.

12. The method of claim 10, wherein the dewatered treated feedstock is heated to between about 200° C. and about 600° C.

13. The method of claim 10, wherein the dewatered treated feedstock is heated to between about 375° C. and about 500° C.

14. The method of claim 10, wherein the dewatered treated feedstock is heated for between about one second and about four hours.

* * * * *